July 31, 1945.   B. CONES   2,380,631
HIGH LIFT VALVE
Filed Dec. 4, 1943   2 Sheets-Sheet 1
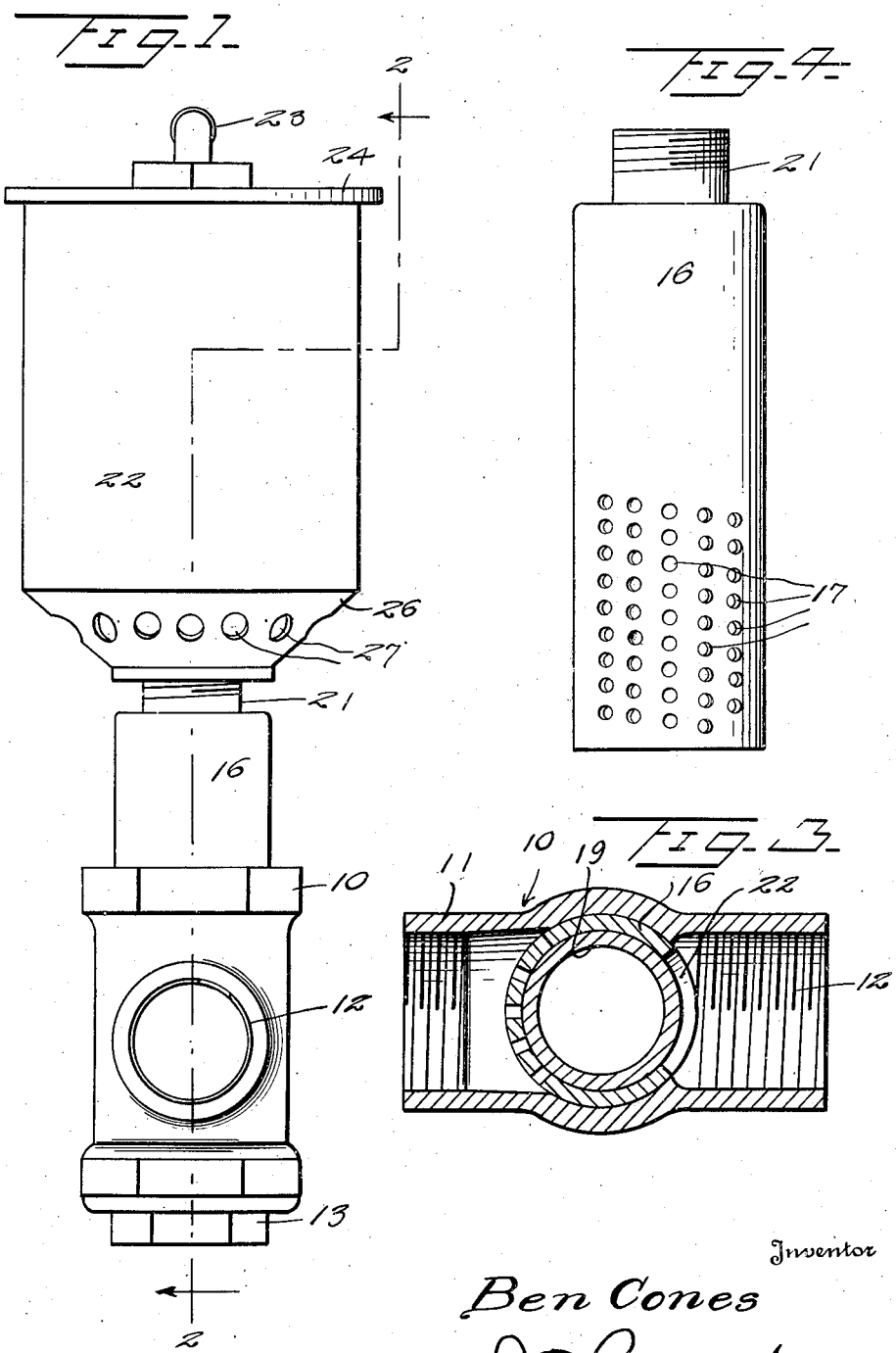
Inventor
Ben Cones
By L. F. Randolph
Attorney July 31, 1945.  B. CONES  2,380,631
HIGH LIFT VALVE
Filed Dec. 4, 1943  2 Sheets-Sheet 2
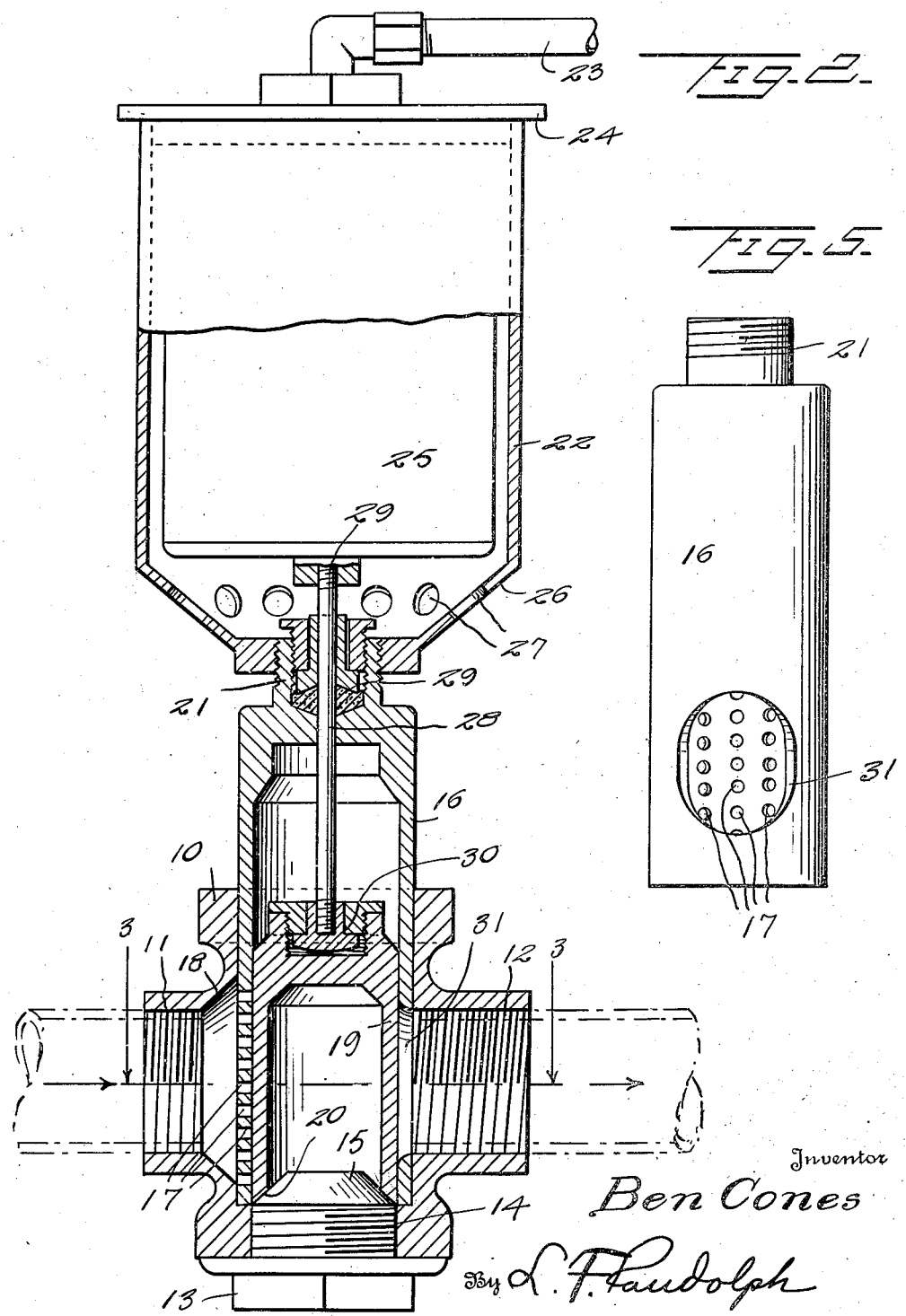
Inventor
Ben Cones
By L. F. Randolph
Attorney Patented July 31, 1945

2,380,631

UNITED STATES PATENT OFFICE 2,380,631

HIGH LIFT VALVE

Ben Cones, Indianapolis, Ind.

Application December 4, 1943, Serial No. 512,917

1 Claim. (Cl. 251—34)

This invention relates to a high lift valve primarily for automatic temperature control.

It is particularly aimed to provide such a valve as will give gradual control of heating or cooling systems, and to provide means whereby a cylinder air motor or other diaphragm valve has sufficient travel to fully open or close the valve.

The more specific objects and advantages will in part be pointed out and otherwise become apparent from a consideration of the description following taken in connection with accompanying drawings illustrating an operative embodiment by way of example.

In said drawings:

Figure 1 is a view of the control valve in elevation;

Figure 2 is an enlarged view primarily taken on the line 2—2 of Figure 1;

Figure 3 is a horizontal section taken on the line 3—3 of Figure 2;

Figure 4 is an elevation of the valve sleeve or cage; and

Figure 5 is another elevation of said sleeve or cage taken 180 degrees with respect to Figure 4.

Referring specifically to the drawings wherein like reference characters designate like or similar parts, 10 designates a cast or other valve body having an inlet 11 and an outlet at 12 for a heating medium or a cooling medium, said inlet and outlet preferably being screw threaded for connection of pipes or conduits thereto as suggested in dotted lines. The bottom of the body is closed by a plug in the form of a nut 13 screw threaded into the same at 14 and having a ground conical seat at 15.

Press fitted into the body 10 as shown is a sleeve or cage 16 which has ports 17 in line with the inlet 11 whose combined area is approximately twenty percent greater than the area of the inlet 12, and such ports may be drilled on an angle for progressive opening and closing. It will be particularly noted that the inlet 11 widens at 18 toward the ports 17.

Rotatable and slidable within the sleeve or cage 16 is a piston 19 whose lower edge is beveled to the same angle as that of the cone 15 and such edge 20, as well as the cone 15 are ground to form an intimate and tight joint. The sleeve or cage 16 is elongated and extends above the body 10 to such an extent as to enable the valve 19 to have ample movement fully opening and closing the ports 17.

Sleeve 16 is preferably made of stainless steel or steam bronze. The same is true of the piston 19. However, each will be made of the same metal so that their expansion and contraction will be the same.

Said sleeve or cage 16 has a screw threaded neck 21 at the top whereby a cylindrical housing 22 is attached thereto. At the top, a pipe or copper tubing 23 leads to the cap 24 on said cylinder and it serves as an air connection. A cylindrical motor 25 is vertically movable in the housing 22 and such housing adjacent the bottom and in an inclined wall 26 is provided with openings or perforations to allow for air circulation and adjustment of valve stem connections. This cylinder motor 25 is the same as that disclosed in my co-pending application, Serial Number 492,099.

A stem 28 is detachably screw threaded at 29 to the base of the motor and it depends therefrom and slidably through the upper end of the sleeve 16, with standard valve stem packing means 29 mounted in such upper end of the sleeve and surrounding the stem 28 in fluid-tight relation. Such stem 28 at its lower end has a swivel connection at 30 such as the standard valve stem and disc connection, with the piston 19, to permit the valve 19 to both slide and rotate without binding, although with an accurate fit, so that there will be a seal between inlet side and outlet side of the valve.

It will be realized that the parts 22 and 25 may be made of any suitable material, for instance, metal, rubber, or the like.

In operation, the piston valve 19 will be operated by the motor 25 and various efficient currents for its movement within the sleeve 16 will fully open and close all ports. The cooling medium or heating medium will enter through the inlet 11, expanding at 18, passing through the ports 17, through the sleeve 16, and from the latter through a port 31 in line with the outlet 12. As previously stated, the engagement between the surface 20 and cone surface 15 is a ground joint so that a seal will be produced.

Various changes may be resorted to provided they fall within the spirit and scope of the invention.

I claim as my invention:

A structure of the class described including a valve body having an inlet and an outlet, a sleeve in said body, said inlet being widened at the sleeve to enable expansion of the fluid passing therethrough, said sleeve in line with the wide portion of the inlet having ports of an overall area in excess of the normal area of the inlet, said sleeve also being ported for communication with the outlet, a piston slidable in the sleeve, and said sleeve being of a size to enable said piston to fully open and close said ports, means to actuate the piston, a plug in said body, and a ground joint on an inclined surface between said piston and said plug.

BEN CONES.